(12) United States Patent
Otomo

(10) Patent No.: US 9,132,353 B2
(45) Date of Patent: Sep. 15, 2015

(54) GAME SYSTEM WITH GAME SCREEN AND GUIDANCE OPERATION AREA

(71) Applicant: DeNA Co., Ltd., Tokyo (JP)

(72) Inventor: Takahiro Otomo, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 14/019,913

(22) Filed: Sep. 6, 2013

(65) Prior Publication Data

US 2015/0065255 A1 Mar. 5, 2015

(30) Foreign Application Priority Data

Aug. 29, 2013 (JP) ................................. 2013-178582

(51) Int. Cl.
*A61F 13/42* (2006.01)
*A63F 13/422* (2014.01)
*A63F 13/69* (2014.01)
*A63F 13/798* (2014.01)

(52) U.S. Cl.
CPC ............... *A63F 13/422* (2014.09); *A63F 13/69* (2014.09); *A63F 13/798* (2014.09)

(58) Field of Classification Search
CPC ...... A63F 13/422; A63F 13/69; A63F 13/798
USPC ........................................................... 463/9
See application file for complete search history.

(56) References Cited

U.S. PATENT DOCUMENTS

2013/0005490 A1  1/2013  Ooya

FOREIGN PATENT DOCUMENTS

| JP | 2005-168890 A | 6/2005 |
| JP | 2007-244631 A | 9/2007 |
| JP | 2013-013509 A | 1/2013 |
| JP | 2013-027477 A | 2/2013 |
| JP | 2013-111483 A | 6/2013 |

OTHER PUBLICATIONS

Japanese Patent Application No. 2013-178582: Office Action mailed on Oct. 15, 2013.
"Capturing Legend Card!!", Famitsu mobage, Enterbrain, Inc., Jul. 21, 2011, No. 2, pp. 58 to 59.
Japanese Patent Application No. 2013-178582: Notice of Allowance mailed on Dec. 3, 2013.

*Primary Examiner* — Corbett B Coburn
(74) *Attorney, Agent, or Firm* — Procopio, Cory, Hargreaves & Savitch LLP

(57) ABSTRACT

To reduce labor of a player to search for game content sought by the player. A game program according to the present invention causes a computer to execute: when an operation to designate game content is performed by a player, play event selection processing to select a play event in which the designated game content is obtainable from among a plurality of play events set in advance; game screen generation processing to generate a game screen including a guidance operation area that guides the player to the selected play event; and game progress processing to make a game progress with the guided play event and to make the player play the game when the guidance operation area is operated by the player while the game screen is displayed.

6 Claims, 17 Drawing Sheets

| ITEM ID | ITEM NAME | PRICE |
|---|---|---|
| 0001 | ITEM A | 100 |
| 0002 | ITEM B | 200 |
| 0003 | ITEM C | 300 |
| ⋮ | ⋮ | ⋮ |

FIG. 5

| CHARACTER ID | CHARACTER NAME | CHARACTER IMAGE | RARITY | INITIAL ATTACK POINT | INITIAL DEFENSE POINT |
|---|---|---|---|---|---|
| 0001 | CHARACTER A | 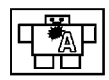 | COMMON | 15 | 8 |
| 0002 | CHARACTER B | 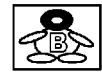 | UNCOMMON | 30 | 20 |
| 0003 | CHARACTER C | 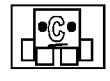 | RARE | 45 | 30 |
| 0004 | CHARACTER D |  | SUPER RARE | 60 | 55 |
| ⋮ | ⋮ | ⋮ | ⋮ | ⋮ | ⋮ |

| INITIAL HIT POINT | UPPER LIMIT ATTACK POINT | UPPER LIMIT DEFENSE POINT | UPPER LIMIT HIT POINT | ITEM ID | DROP RATE | FUSION INFORMATION |
|---|---|---|---|---|---|---|
| 10 | 100 | 100 | 100 | 0001 | 40 | FUSION INFORMATION (1) |
| 15 | 300 | 300 | 300 | 0005 | 30 | FUSION INFORMATION (2) |
| 25 | 600 | 600 | 600 | 0020 | 20 | FUSION INFORMATION (3) |
| 60 | 1000 | 1000 | 1000 | 0045 | 10 | FUSION INFORMATION (4) |
| ⋮ | ⋮ | ⋮ | ⋮ | ⋮ | ⋮ | ⋮ |

FIG. 6

| FUSION INFORMATION (1) | |
|---|---|
| MATERIAL CHARACTER | THE NUMBER OF MATERIAL CHARACTERS |
| 0002 | 1 |
| 0003 | 1 |
| 0004 | 1 |

FUSION INFORMATION (2)

FUSION INFORMATION (3)

FIG. 7

| STAGE ID | STAGE NAME | CHARACTER TO APPEAR | |
|---|---|---|---|
| | | CHARACTER ID | APPEARANCE RATE |
| 001 | STAGE 1 | 0001 | 100% |
| 002 | STAGE 2 | 0002 | 100% |
| 003 | STAGE 3 | 0001 | 80% |
| | | 0003 | 100% |
| 004 | STAGE 4 | 0002 | 80% |
| | | 0003 | 60% |
| | | 0004 | 100% |
| 005 | STAGE 5 | 0002 | 80% |
| | | 0004 | 60% |
| | | 0005 | 100% |
| ⋮ | ⋮ | ⋮ | ⋮ |

FIG. 8

| LOTTERY ID | DECK NAME | DECK INFORMATION |
|---|---|---|
| 001 | DECK 1 | DECK INFORMATION (1) |
| 002 | DECK 2 | DECK INFORMATION (2) |
| 003 | DECK 3 | DECK INFORMATION (3) |
| ⋮ | ⋮ | ⋮ |

FIG. 9

DECK INFORMATION (3)

DECK INFORMATION (2)

DECK INFORMATION (1)

| NUMBER | RARITY | CARD ID |
|---|---|---|
| 1 | COMMON | 2011 |
| ⋮ | ⋮ | ⋮ |
| 100 | RARE | 1003 |
| ⋮ | ⋮ | ⋮ |
| 200 | RARE | 0823 |
| ⋮ | ⋮ | ⋮ |
| 300 | RARE | 0013 |
| ⋮ | ⋮ | ⋮ |
| 900 | SUPER RARE | 0004 |

FIG. 10

| SHOP ID | SHOP NAME | ITEM ID |
|---------|-----------|---------|
| 001 | SHOP 1 | 0001,0002,··· |
| 002 | SHOP 2 | 0101,0102,··· |
| 003 | SHOP 3 | 0201,0202,··· |
| ⋮ | ⋮ | ⋮ |

FIG. 11

| PLAYER ID | VIRTUAL CURRENCY | POSSESSED CHARACTER INFORMATION | POSSESSED ITEM INFORMATION | CHARACTER PICTURE BOOK INFORMATION | ITEM PICTURE BOOK INFORMATION | CLEARED STAGE INFORMATION |
|---|---|---|---|---|---|---|
| 1 | 0 | POSSESSED CHARACTER INFORMATION (1) | POSSESSED ITEM INFORMATION (1) | CHARACTER PICTURE BOOK INFORMATION (1) | ITEM PICTURE BOOK INFORMATION (1) | CLEARED STAGE INFORMATION (1) |
| 2 | 500 | POSSESSED CHARACTER INFORMATION (2) | POSSESSED ITEM INFORMATION (2) | CHARACTER PICTURE BOOK INFORMATION (2) | ITEM PICTURE BOOK INFORMATION (2) | CLEARED STAGE INFORMATION (2) |
| 3 | 700 | POSSESSED CHARACTER INFORMATION (3) | POSSESSED ITEM INFORMATION (3) | CHARACTER PICTURE BOOK INFORMATION (3) | ITEM PICTURE BOOK INFORMATION (3) | CLEARED STAGE INFORMATION (3) |
| 4 | 1000 | POSSESSED CHARACTER INFORMATION (4) | POSSESSED ITEM INFORMATION (4) | CHARACTER PICTURE BOOK INFORMATION (4) | ITEM PICTURE BOOK INFORMATION (4) | CLEARED STAGE INFORMATION (4) |
| 5 | 100 | POSSESSED CHARACTER INFORMATION (5) | POSSESSED ITEM INFORMATION (5) | CHARACTER PICTURE BOOK INFORMATION (5) | ITEM PICTURE BOOK INFORMATION (5) | CLEARED STAGE INFORMATION (5) |
| 6 | 3000 | POSSESSED CHARACTER INFORMATION (6) | POSSESSED ITEM INFORMATION (6) | CHARACTER PICTURE BOOK INFORMATION (6) | ITEM PICTURE BOOK INFORMATION (6) | CLEARED STAGE INFORMATION (6) |
| . | . | . | . | . | . | . |
| . | . | . | . | . | . | . |
| . | . | . | . | . | . | . |

FIG. 12

POSSESSED CHARACTER INFORMATION (3)
POSSESSED CHARACTER INFORMATION (2)
POSSESSED CHARACTER INFORMATION (1)

| CHARACTER ID | LEVEL | ATTACK POINT | DEFENSE POINT | HIT POINT | ACQUISITION DATE AND TIME |
|---|---|---|---|---|---|
| 0011 | LV. 3 | 15 | 10 | 200 | 2012/2/13 10:00 |
| 0211 | LV. 4 | 20 | 23 | 150 | 2012/2/13 12:00 |
| 0133 | LV. 1 | 70 | 45 | 100 | 2012/2/14 11:30 |
| 0201 | LV. 4 | 22 | 40 | 600 | 2012/2/15 18:00 |
| 0072 | LV. 7 | 60 | 50 | 250 | 2012/2/16 13:30 |
| 0094 | LV. 1 | 300 | 200 | 450 | 2012/2/16 19:00 |
| . | . | . | . | . | . |
| . | . | . | . | . | . |
| . | . | . | . | . | . |

FIG. 13

POSSESSED ITEM INFORMATION (3)
POSSESSED ITEM INFORMATION (2)
POSSESSED ITEM INFORMATION (1)

| ITEM ID | POSSESSED NUMBER |
|---|---|
| 0001 | 20 |
| 0002 | 10 |
| 0003 | 1 |
| ⋮ | ⋮ |

FIG. 14

CHARACTER PICTURE BOOK INFORMATION (3)
CHARACTER PICTURE BOOK INFORMATION (2)
CHARACTER PICTURE BOOK INFORMATION (1)

| CHARACTER ID | CONTAINED FLAG |
|---|---|
| 0001 | TRUE |
| 0002 | FALSE |
| 0003 | FALSE |
| 0004 | FALSE |
| 0011 | TRUE |
| 0012 | TRUE |
| ⋮ | ⋮ |

FIG. 15

ITEM PICTURE BOOK INFORMATION (3)
ITEM PICTURE BOOK INFORMATION (2)
ITEM PICTURE BOOK INFORMATION (1)

| ITEM ID | CONTAINED FLAG |
|---|---|
| 0001 | TRUE |
| 0005 | FALSE |
| 0006 | TRUE |
| 0008 | FALSE |
| 0015 | FALSE |
| 0016 | TRUE |
| . | . |
| . | . |
| . | . |

FIG. 16

CLEARED STAGE INFORMATION (3)
CLEARED STAGE INFORMATION (2)
CLEARED STAGE INFORMATION (1)

| ITEM ID | CONTAINED FLAG |
|---|---|
| 0001 | TRUE |
| 0002 | TRUE |
| 0003 | TRUE |
| 0004 | TRUE |
| 0005 | FALSE |
| 0006 | FALSE |
| . | . |
| . | . |
| . | . |

GAME SYSTEM WITH GAME SCREEN AND GUIDANCE OPERATION AREA

CROSS-REFERENCE TO RELATED APPLICATION(S)

This application claims the benefit of Japanese Patent Application No. 2013-178582, filed Aug. 29, 2012, the disclosure of which is hereby incorporated by reference in its entirety.

BACKGROUND OF THE INVENTION

1. Field of the Invention

The present invention relates to a game program and an information processing device.

2. Description of the Related Art

A game system that starts a battle against a character encountered in a game field and provides a player with game content (for example, an item) according to a battle result and the like is known (for example, Japanese Patent Application Laid-Open No. 2013-013509).

SUMMARY OF THE INVENTION

In such a game system, when the player designates the game content that has been obtained before, detailed information related to the designated game content is displayed on a game screen. However, even if the player can browse the detailed information related to the game content designated by the player, the player needs to search for the game content again when he wishes to obtain the game content again. The present invention has been made in view of the foregoing, and an objective is to reduce labor of the player to search for the game content sought by the player.

A principal invention of the present invention to solve the above-described problem is a non-transitory computer-readable storage medium for causing a computer to execute:

when an operation to designate game content is performed by a player, play event selection processing to select a play event in which the designated game content is obtainable from among a plurality of play events set in advance;

game screen generation processing to generate a game screen including a guidance operation area that guides the player to the selected play event; and game progress processing to make a game progress with the guided play event and to make the player play the game when the guidance operation area is operated by the player while the game screen is displayed.

Other characteristics of the present invention will become clear from the description of the present specification and the appended drawings.

According to the present invention, labor of a player to search for game content sought by the player can be saved.

BRIEF DESCRIPTION OF THE DRAWINGS

FIG. 5 is a diagram illustrating an example of a data structure of character information;

FIG. 6 is a diagram illustrating an example of a data structure of fusion information;

FIG. 7 is a diagram illustrating an example of a data structure of stage information;

FIG. 8 is a diagram illustrating an example of a data structure of lottery information;

FIG. 9 is a diagram illustrating an example of a data structure of deck information;

FIG. 10 is a diagram illustrating an example of a data structure of shop information;

FIG. 11 is a diagram illustrating an example of a data structure of player information;

FIG. 12 is a diagram illustrating an example of a data structure of a possessed character information;

FIG. 13 is a diagram illustrating an example of a data structure of possessed item information;

FIG. 14 is a diagram illustrating an example of a data structure of character picture book information;

FIG. 15 is a diagram illustrating an example of a data structure of item picture book information;

FIG. 16 is a diagram illustrating an example of a data structure of cleared stage information;

DETAILED DESCRIPTION OF THE INVENTION

Figure 1:
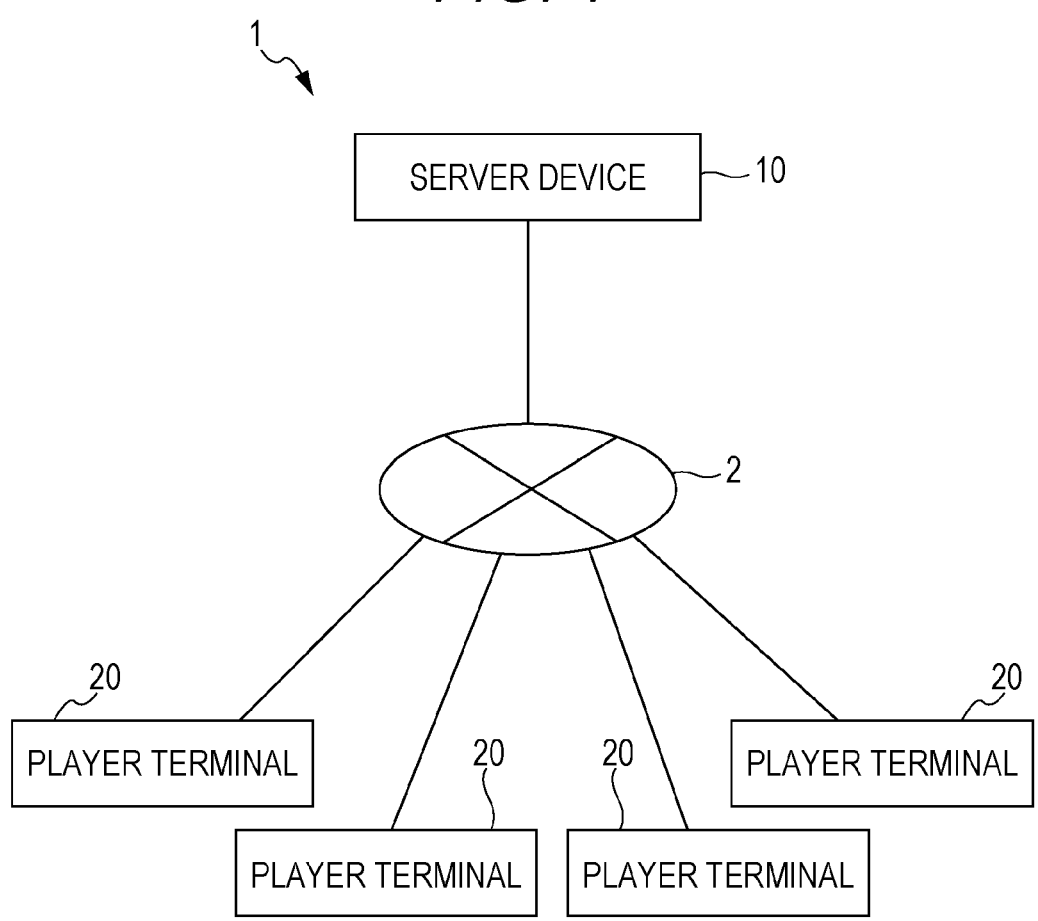
FIG. 1 is a diagram illustrating an overall configuration example of a game system.

At least the following matters will become clear according to the description of the present specification and the appended drawings.

That is, a game program that causes a computer to execute:

when an operation to designate game content is performed by a player, play event selection processing to select a play event in which the designated game content is obtainable from among a plurality of play events set in advance;

game screen generation processing to generate a game screen including a guidance operation area that guides the player to the selected play event; and game progress processing to make a game progress with the guided play event and to make the player play the game when the guidance operation area is operated by the player while the game screen is displayed.

According to the game program, the player can be guided to a play event in which the game content designated by the player is obtainable, whereby the labor of the layer to search for the game content sought by the player can be saved.

Further, when an operation to designate material game content from among base game content and material game content is performed by the player, the play event selection processing may select a play event in which the material game content is obtainable from among the plurality of play events set in advance, and when the designated material game content has been obtained by the player when making the game progress with the guided play event, the game progress processing may permit fusion of the obtained material game content and the base game content.

According to the game program, the player can be guided to a play event in which the material game content to be subjected to fusion with the base game content is obtainable.

Further, the computer may be caused to execute, when all of the material game content associated with the base game content have been obtained by the player, game content fusion processing to vary a parameter set to the base game content by performing fusion of the base game content and all of the material game content.

According to the game program, when the player has obtained all of the material game content associated with the base game content by the obtainment of the material game content in the guided play event, the player can use the all of the material game content in fusion with the base game content.

The play event selection processing may select a play event in which a probability of obtaining the designated game content is set higher in preference to a play event to which the probability of obtaining the designated game content is set lower, from among a plurality of game scenes set in advance.

According to the game program, the player can easily obtain the game content in the guided play event.

The play event selection processing may select a play event in which the designated game content is obtainable from among the plurality of play events based on player information related to the player.

According to the game program, when the guided play event is selected, the player information of the guided player can be reflected.

Next, an information processing device including:

a play event selection unit configured, when an operation to designate game content is performed by a player, to select a play event in which the designated game content is obtainable from among a plurality of play events set in advance;

a game screen generation unit configured to generate a game screen including a guidance operation area that guides the player to the selected play event; and a game progress processing unit configured, when the guidance operation area has been operated by the player while the game screen is displayed, to make a game progress with the guided play event and to make the player play the game.

According to the information processing device, the labor of the player to search for the game content sought by the player can be saved.

EMBODIMENTS

Configuration of Game System 1

FIG. 1 is a diagram illustrating an example of an overall configuration of a game system 1 according to the present embodiment. The game system 1 provides a player with various services related to a game through a network 2 (for example, the Internet and the like), and includes a server device 10 and a plurality of player terminals 20.

<<Configuration of Server Device 10>>

Figure 2:
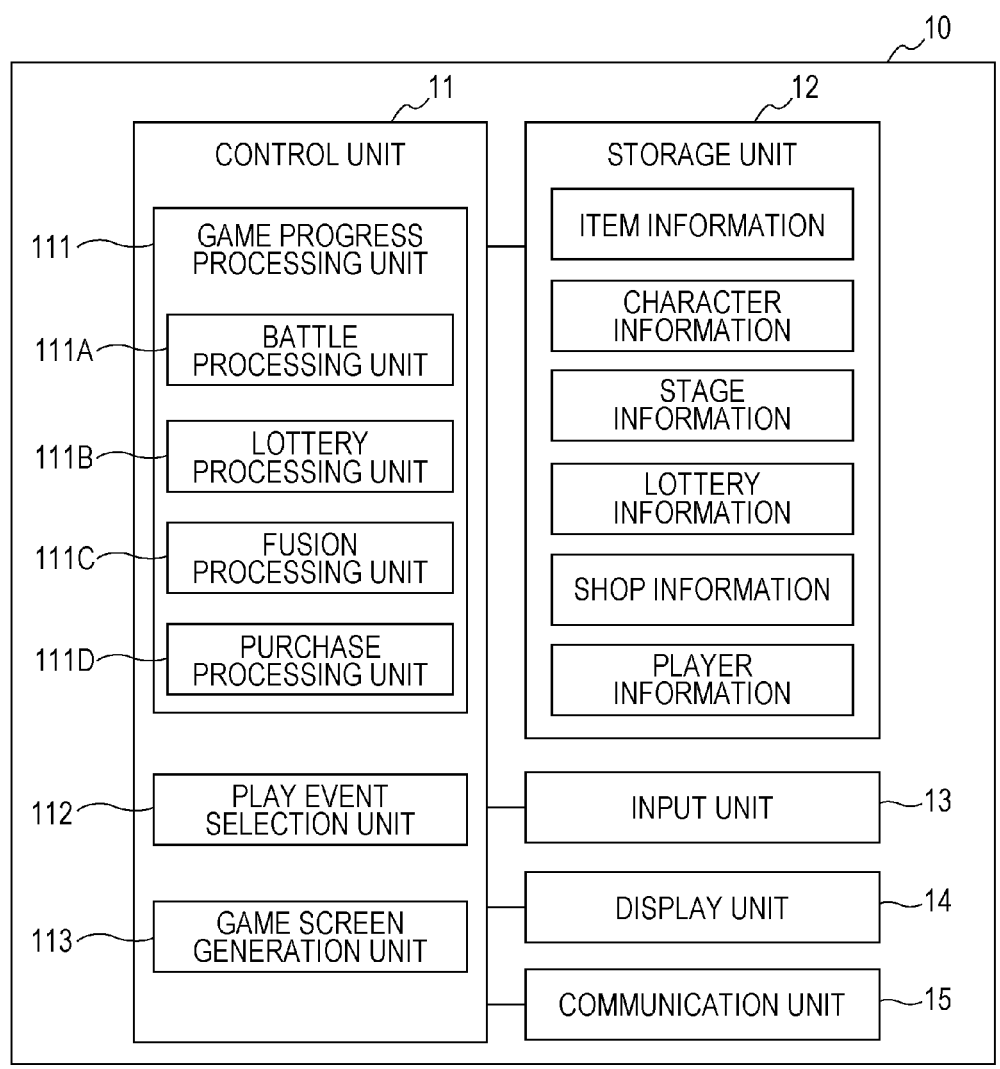
FIG. 2 is a block diagram illustrating a functional configuration of a server device.

FIG. 2 is a block diagram illustrating a functional configuration of the server device 10 according to the present embodiment. The server device 10 is an information processing device (for example, a workstation, a personal computer, and the like) used when a system administrator and the like manage the game service. The server device 10 can distribute a game program operable on the player terminal 20, and a web page (game screen, and the like) made in a markup language (HTML, and the like) according to a specification of the player terminal 20 upon receiving various commands (requests) from the player terminal 20. The server device 10 includes a control unit 11, a storage unit 12, an input unit 13, a display unit 14, and a communication unit 15.

The control unit 11 performs data passing among units as well as controlling the entire server device 10, and is realized by a central processing unit (CPU) executing a program stored in a predetermined memory. The control unit 11 of the present embodiment includes a game progress processing unit 111, a play event selection unit 112, and a game screen generation unit 113.

The game progress processing unit 111 includes a function to execute processing to make a game progress according to a game program. The game progress processing unit 111 at least includes a battle processing unit 111A, a lottery processing unit 111B, a fusion processing unit 111C, and a purchase processing unit 111D.

The battle processing unit 111A includes a function to execute various types of processing related to a battle game. The lottery processing unit 111B includes a function to execute various types of processing related to a lottery game. The fusion processing unit 111C includes a function to execute various types of processing related to fusion of game content. The purchase processing unit 111D includes a function to execute various types of processing related to purchase of game content. The game content is electronic game data, and for example, includes items such as characters, game cards and figures associated with the characters, and tools and abilities used in the game.

The play event selection unit 112 includes a function to execute processing to select a play event from among a plurality of play events set in the game system 1 in advance. The play event is a unit of actions of game that can be played by the player, areas where the player can play a game, and the like that are classified into types, in a game that proceeds according to a game program. To classify the play events into higher levels, the play events can be classified into items such as a battle game, a lottery game, and game content purchase, for example. To classify the play events into lower levels, the play events can be classified into items such as various stages (a stage 1, a stage 2, a stage 3, and the like) of a battle game, various decks (a deck 1, a deck 2, a deck 3, and the like) of a lottery game, and various shops (a shop 1, a shop 2, a shop 3, and the like) where the game content can be purchased.

The game screen generation unit 113 includes a function to execute processing to generate screen data used for displaying a game screen in the player terminal 20. The game screen generation unit 113 of the present embodiment generates HTML data as the screen data corresponding to the game screen.

The storage unit 12 includes a read only memory (ROM) that is a read only storage area in which a system program is stored, and a random access memory (RAM) that is a rewritable storage area used as a work area for arithmetic processing by the control unit 11. The storage unit 12 is, for example, realized by a non-volatile storage device, such as a flash memory or a hard disk. The storage unit 12 of the present embodiment at least stores item information, character information, stage information, lottery information, shop information, and player information. Note that each of the information will be described in detail.

The input unit 13 is used by the system administrator and the like for inputting various data (for example, the character information and the like), and is realized by, for example, a keyboard, a mouse, and the like.

The display unit 14 is used for displaying an operation screen for the system administrator based on a command from the control unit 11, and is, for example, realized by a liquid crystal display (LCD) and the like.

The communication unit 15 is used for performing communication with the player terminal 20, and has a function as a reception unit that receives various data and signals transmitted from the player terminal 20, and a function as a transmission unit that transmits various data and signals to the player terminal 20 according to a command of the control unit 11. The communication unit 15 is realized, for example, by a network interface card (NIC) and the like.

<<Configuration of Player Terminal 20>>

Figures 3, 4:
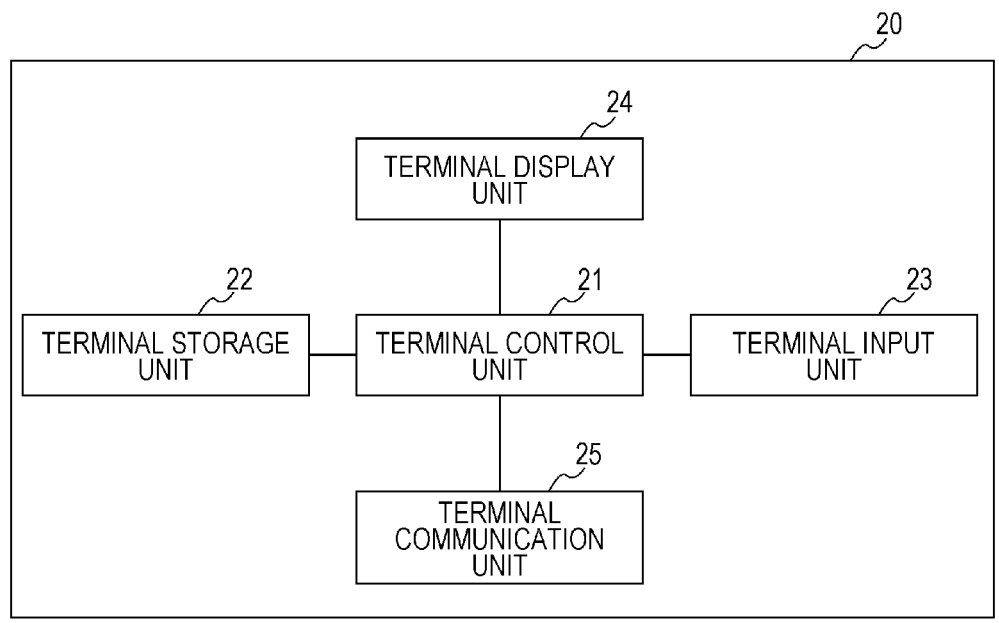
FIG. 3 is a block diagram illustrating a functional configuration of a player terminal.
FIG. 4 is a diagram illustrating an example of a data structure of item information.

FIG. 3 is a block diagram illustrating a functional configuration of the player terminal 20. The player terminal 20 of the present embodiment is an information processing device (for example, a mobile phone terminal, a smart phone, a tablet terminal, and the like) used by the player when playing a game, and can request distribution of various types of information (a game program, a web page, and the like) related to the game to the server device 10. Since the player terminal 20 has a web browser function for allowing the player to browse a web page, the web page (a game screen, and the like) distributed from the server device 10 can be displayed on a screen. The player terminal 20 includes a terminal control unit 21, a terminal storage unit 22, a terminal input unit 23, a terminal display unit 24, and a terminal communication unit 25.

The terminal control unit 21 performs data passing among units and controls the entire player terminal 20, and is realized by the central processing unit (CPU) executing a program stored in a predetermined memory. Note that the terminal control unit 21 of the present embodiment also functions as a screen display control unit that controls a display form of the game screen displayed in the terminal display unit 24. The terminal storage unit 22 is connected to the terminal control unit 21 through a bus, and performs processing of referring to, reading out, rewriting stored data according to a command from the terminal control unit 21. The terminal storage unit 22 is realized, for example, by a flash memory, a hard disk, and the like. The terminal input unit 23 is used for performing various operations (a game operation, and the like) by the player, and is realized, for example, by an operation button, a touch panel, and the like. The terminal display unit 24 is used for displaying a game screen by a command from the terminal control unit 21, and is realized, for example, by a liquid crystal display (LCD) and the like. The terminal communication unit 25 functions as a transmission/reception unit for performing transmission/reception of various types of information with the server device 10 through the network 2, and is realized, for example, by a network interface card (NIC), and the like.

<<Data Structure>>

FIG. 4 is a diagram illustrating an example of a data structure of the item information stored in the storage unit 12 of the server device 10. The item information includes items including an item ID, an item name, and a price. The item ID is identification information that identifies an item. The item name is information indicating a display name of the item. The price is information indicating a value of the item.

FIG. 5 is a diagram illustrating an example of a data structure of the character information stored in the storage unit 12 of the server device 10. The character information includes items (fields) such as a character ID, a character name, a character image, rarity, initial attack point, initial defense point, initial hit point, upper limit attack point, upper limit defense point, upper limit hit point, an item ID, a drop rate, and fusion information. The character ID is identification information that identifies a character. The character name is information that indicates a display name of a character. The character image is image data of a character. The rarity is a parameter indicating the degree of rarity of a character. In the present embodiment, four levels of rarity ("common"→"uncommon"→"rare"→"super rare") are set to characters. The initial attack point, the initial defense point, and the initial hit point of a character are parameters indicating ability values initially set to a character. The item ID is information indicating an item possessed by a character. The drop rate is information indicating a probability with which the player can obtain an item possessed by a character. The fusion information is information that determines fusion conditions of characters.

FIG. 6 is a diagram illustrating an example of a data structure of the fusion information. The fusion information includes items such as a material character and the number of material characters. The material character is information indicating the type of a material character necessary for fusion of a base character. The number of material characters is information indicating the number of material characters necessary for fusion of a base character.

FIG. 7 is a diagram illustrating an example of a data structure of the stage information stored in the storage unit 12 of the server device 10. The stage information includes items such as a stage ID, a stage name, and a character to appear. The stage ID is identification information that identifies a state. The stage name is information indicating a display name of a stage. The character to appear is information indicating a character that appears in the stage, and includes items including a character ID and an appearance rate. The character ID is information indicating the type of a character that appears in the stage. The appearance rate is information indicating a probability with which a character appears in the stage.

FIG. 8 is a diagram illustrating an example of a data structure of the lottery information stored in the storage unit 12 of the server device 10. The lottery information includes items such as a lottery ID, a deck name, and deck information. The lottery ID is identification information that identifies a lottery game. The deck name is information indicating a display name of a deck used in a lottery game. The deck information is information related to a deck configured from a plurality of characters.

FIG. 9 is a diagram illustrating an example of a data structure of the deck information. The deck information is information that defines a character housing deck (also simply referred to as "deck") in which characters that would be provided to the player are put together in one set by every predetermined number. In the deck information, rarity that indicates the degree of rarity is associated with each of a plurality of characters (character IDs) to which serial numbers are provided. A deck in the present embodiment constitutes a character group in which 900 characters to which serial numbers 1 to 900 are provided are arranged in serial order, as illustrated in FIG. 9. In a lottery game, a character selected from the deck is provided to the player.

FIG. 10 is a diagram illustrating an example of a data structure of the shop information stored in the storage unit 12 of the server device 10. The shop information includes items such as a shop ID, a shop name, and an item ID. The shop ID is identification information that identifies a shop where an item is purchased. The shop name is information indicating a display name of a shop. The item ID is information that identifies an item that can be purchased in a shop.

FIG. 11 is a diagram illustrating an example of a data structure of the player information stored in the storage unit 12 of the server device 10. The player information includes items such as a player ID, virtual currency, possessed character information, possessed item information, character picture book information, item picture book information, and cleared stage information. The player ID is identification information that identifies the player. The virtual currency is an example of player points and is information indicating an amount of virtual currency possessed by the player. The player can purchase and possess the virtual currency. The possessed character information is information indicating a character possessed by the player. The possessed item information is information indicating an item possessed by the player. The character picture book information is history information indicating a history of characters that have been possessed by the player before. The item picture book information is history information indicating a history of items that have been possessed by the player before. The cleared stage information is history information indicating a history of stages that have been cleared by the player.

FIG. 12 is a diagram illustrating an example of a data structure of the possessed character information. The possessed character information includes items such as a character ID, the level of a character, attack point, defense point, hit point, and an acquired date and time. The character ID is identification information that identifies a character possessed by the player. The level of a character, the attack point, the defense point, and the hit point are parameters indicating current ability values set to a character possessed by the player. These various parameters are updated according to progress of a game. The acquired date and time is information indicating a date and time at which the player has acquired a character.

FIG. 13 is a diagram illustrating an example of a data structure of the possessed item information. The possessed item information includes items such as an item ID and a possessed number. The item ID is identification information that identifies an item possessed by the player. The possessed number is information indicating a quantity of an item possessed by the player.

FIG. 14 is a diagram illustrating an example of a data structure of the character picture book information. The character picture book information includes items such as a character ID and flag information. The character ID is identification information that identifies a character that has been possessed by the player before. In the flag information, "TRUE" is set to a character ID of a character that has been possessed before, and "FALSE" is set to a character ID of a character that has not been possessed before.

FIG. 15 is a diagram illustrating an example of a data structure of the item picture book information. The item picture book information includes items such as an item ID and flag information. The item ID is identification information that identifies an item that has been possessed by the player before. In the flag information, "TRUE" is set to an item ID of an item that has been possessed before, and "FALSE" is set to an item ID of an item that has not been possessed before.

FIG. 16 is a diagram illustrating an example of a data structure of the cleared stage information. The cleared stage information includes items such as a stage ID and flag information. The stage ID is identification information that identifies a stage that has been cleared by the player before. In the flag information, "TRUE" is set to a stage ID of a stage that has been cleared before, and "FALSE" is set to a stage ID of a stage that has not been cleared before.

<<Outline of Game>>

Here, an outline of a game provided by the game system 1 of the present embodiment will be described. The game system 1 provides a battle game performed using a character as an example of the game content, a lottery game that provides the player with a character selected by a lottery, character fusion that performs fusion of a plurality of characters, item purchase that allows the player to purchase an item as an example of the game content, browsing of detailed information related to a character and an item, and the like.

<Battle Game>

In the game system 1 of the present embodiment, the player can possess a plurality of characters. The player can play a battle game using a character selected from among the plurality of characters possessed by the player. In the battle game, a plurality of stages (a stage 1, a stage 2, a stage 3, and the like) is set. In each stage, an enemy character that is as an opponent appears. The player character selected by the player can be caused to battle against the enemy character. When the player wins the battle against the enemy character, the player can obtain an item possessed by the enemy character, or can obtain the enemy character itself. Then, if the player satisfies predetermined cleared conditions (for example, wins a battle against a boss character that appears), the player can clear the stage and proceed to the next stage.

<Lottery Game>

In the game system 1 in the present embodiment, the player can play a lottery game so-called "Gacha Gacha" (registered trademark). In the lottery game, a character selected from a plurality of characters that constitutes a deck is provided to the player. In the lottery game, a plurality of decks (a deck 1, a deck 2, a deck 3, and the like) is set. Since the types of characters housed in each deck are different, the player can play a lottery game aiming for obtainment of a desired character by selecting a deck.

<Character Fusion>

In the game system 1 of the present embodiment, the player can perform character fusion by combining a plurality of characters. By performing the character fusion, the player can change the parameters (for example, the level, the attack point, the defense point, and the like) set to the character after fusion.

(Strengthening Fusion)

In the present embodiment, the character fusion is performed by combining a base character with at least one material character. With this character fusion, a current value of a parameter set to the base character before the fusion is raised, and a raised new current value of the parameter is set to the base character after the fusion. When the character fusion has been performed in this way, the player possesses only the base character strengthened by the fusion without possessing both of the base character and the material character.

(Evolutionary Fusion)

Further, in the present embodiment, by performing fusion of the base character and all material characters associated with the base character, not only the current value set to the base character but also an upper limit value can be raised, and a raised value can be newly set to the parameter. Note that, with this evolutionary fusion, the character ID of the base character may be changed or the current value of the parameter such as the attack point may be set to return to an initial value. When the character fusion is performed in this way, the player possesses only the base character evolved by the fusion (newly produced character) without possessing the base character and the all material characters.

<Item Purchase>

In the game system 1 of the present embodiment, the player can purchase a desired item at a shop on the game by consuming the virtual currency. In this item purchase, a plurality of shops (a shop 1, a shop 2, a shop 3, and the like) is set. Since items that can be purchased at the shops are different from each other, the player can purchase a desired item by selecting a shop.

<Browsing of Detailed Information, Guidance to Play Event>

The game system 1 of the present embodiment can allow the player to browse detailed information related to a material character associated with a base character. When desiring obtainment of the material character, the player operates a guided operation button, so that the player is instantly guided to a play event in which the material character is obtainable. Therefore, the player can play a game aiming for obtainment of the material character in the guided play event. That is, the player does not need to play a battle game while searching for a stage in which the material character appears or to play a lottery game while searching for a deck in which the material character is housed. Therefore, the labor to search for the material character can be saved.

In addition, the game system 1 of the present embodiment can allow the player to browse detailed information related to an item that has been possessed before or detailed information related to a character that the player has encountered before with a picture book. When desiring obtainment of the item or the character, the player operates the guided operation button, so that the player is instantly guided to a play event in which the item or the character is obtainable. Therefore, the player can play a game aiming for obtainment of the item in the guided play event. Accordingly, the player does not need to play a battle game while searching for a stage in which the character that possesses the item appears, or to search for a shop at which the item can be purchased. Therefore, the labor to search for the item or the character can be saved.

<<<Operation of Game System 1>>>

In the game system according to the present embodiment, the control unit 11 in the server device 10 controls function units that are objects to be controlled according to a game program stored in the storage unit 12, thereby to execute battle game processing, lottery game processing, character fusion processing, item purchase processing, and picture book browsing processing. Hereinafter, each of the processing will be described.

<Battle Game Processing>

When the player designates a stage and performs an operation to start a battle game, the player terminal 20 transmits a battle game start request to the server device 10. Upon receiving the battle game start request transmitted from the player terminal 20, the server device 10 executes the battle game processing.

To be specific, the battle processing unit 111A refers to the possessed character information illustrated in FIG. 12, and selects a player character, and refers to the stage information illustrated in FIG. 7, and selects an enemy character that is to be as an opponent. Next, the battle processing unit 111A refers to the stage information illustrated in FIG. 7, and determines whether causing the enemy character to appear in the stage designated by the player based on the appearance rate of the enemy character. Next, when having determined the appearance of the enemy character, the battle processing unit 111A refers to the possessed character information illustrated in FIG. 12, and obtains various parameters (the attack point, the defense point, the hit point, and the like) set to the player character as well as referring to the character information illustrated in FIG. 5, and obtains various parameters (the attack point, the defense point, the hit point, and the like) set to the enemy character. Next, the battle processing unit 111A determines an outcome of the battle between the characters based on the various parameters of the player character and the various parameters of the enemy character. Next, when having determined a victory of the player, the battle processing unit 111A provides the player with the enemy character with a predetermined probability, and updates the possessed character information illustrated in FIG. 12. In addition, the battle processing unit 111A provides the player with an item possessed by the enemy character according to the drop rate (see FIG. 5) of the enemy character, and updates the possessed item information illustrated in FIG. 13. The battle processing unit 111A determines whether the player satisfies the predetermined cleared conditions by repetition of a battle between the player character and an enemy character appearing one after another. When the cleared conditions are satisfied, the stage is cleared. Therefore, the battle processing unit 111A permits a game play in the next stage, and updates the cleared stage information illustrated in FIG. 16.

<Lottery Game Processing>

When the player designates a deck and performs an operation to start a lottery game, the player terminal 20 transmits a lottery game start request to the server device 10. Upon receiving the lottery game start request transmitted from the player terminal 20, the server device 10 executes the lottery game processing.

To be specific, the lottery processing unit 111B refers to the lottery information illustrated in FIG. 8, and selects the deck designated by the player. Next, the lottery processing unit 111B refers to the deck information illustrated in FIG. 9, and provides the player with a character randomly selected from among a plurality of characters housed in the deck. Next, the lottery processing unit 111B updates the possessed character information illustrated in FIG. 12 so that the provided character becomes a character possessed by the player.

<Character Fusion Processing>

(Strengthening Fusion)

When the player designates a base character and a material character and performs an operation to start strengthening fusion of character, the player terminal 20 transmits a strengthening fusion request to the server device 10. Upon receiving the strengthening fusion request transmitted from the player terminal 20, the server device 10 executes the character fusion processing (strengthening fusion).

To be specific, the fusion processing unit 111C refers to the possessed character information illustrated in FIG. 12, and selects the base character and the material character designated by the player from among a plurality of character s possessed by the player. Next, the fusion processing unit 111C refers to the possessed character information illustrated in FIG. 12, raises the current values of the parameters such as the level, the attack point, and the defense point of the base character based on the current values of the parameters such as the level, the attack point, and the defense point of the material character, and sets the parameters of raised new current values to the base character. The fusion processing unit 111C then updates the possessed character information illustrated in FIG. 12 so that the material character used in the fusion is no longer the character possessed by the player and the base character after the fusion becomes a character possessed by the player.

(Evolutionary Fusion)

Figure 17:
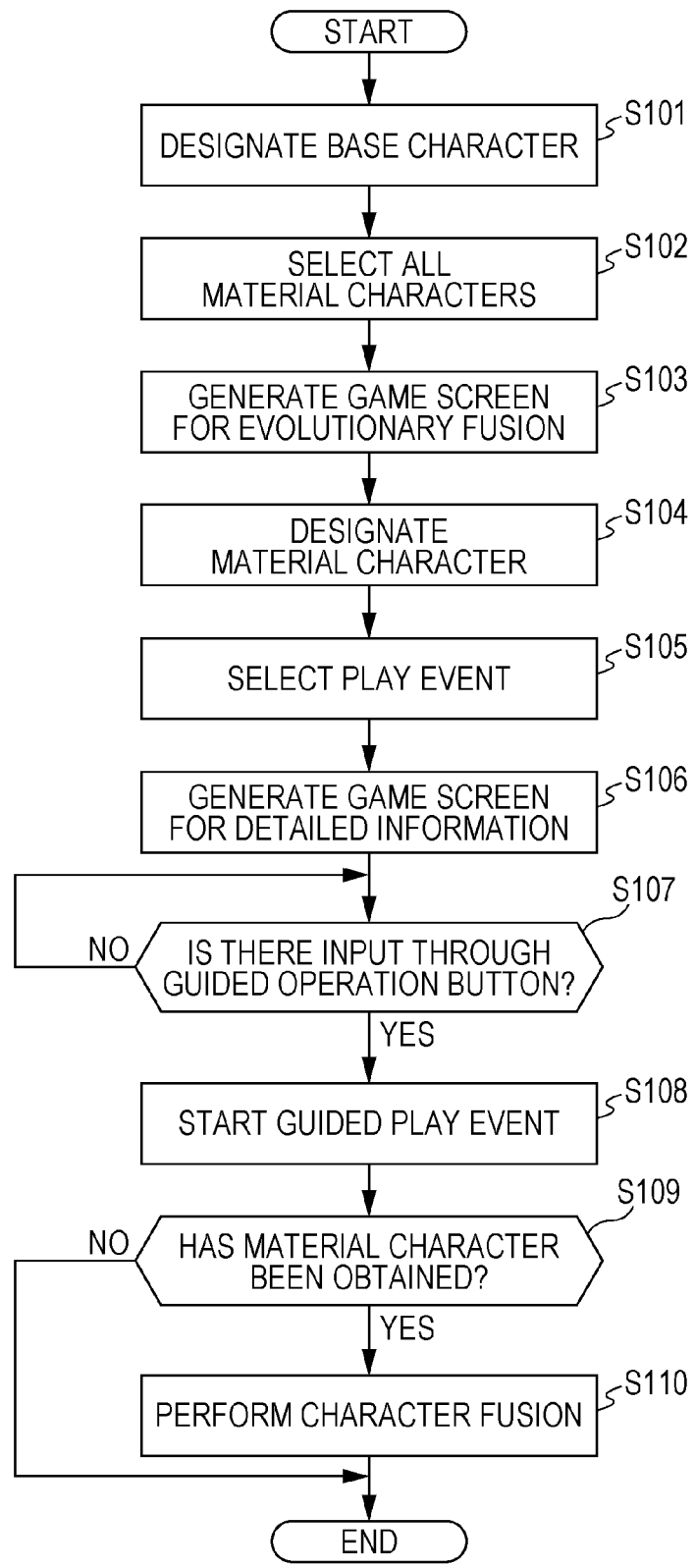
FIG. 17 is a flowchart for describing character fusion processing.

FIG. 17 is a flowchart for describing the character fusion processing (evolutionary fusion) according to the present embodiment.

First, when the player designates a base character and performs an operation to start evolutionary fusion of the character, the player terminal 20 transmits an evolutionary fusion request to the server device 10 (S101).

Next, upon receiving the evolutionary fusion request transmitted from the player terminal 20, the server device 10 selects all material characters associated with the base character (S102). That is, the fusion processing unit 111C refers to the character information illustrated in FIG. 5 and the fusion information illustrated in FIG. 6, and selects all material characters associated with the base character.

Next, the server device 10 causes the game screen generation unit 113 to generate screen data (HTML file) used for displaying a game screen for evolutionary fusion (web page) in the player terminal 20 (S103).

To be specific, the fusion processing unit 111C refers to the possessed character information illustrated in FIG. 12 and the fusion information illustrated in FIG. 6, and determines whether the player possesses the all material characters associated with the base character (whether the player satisfies the fusion conditions). When the determination is affirmed, the fusion processing unit 111C causes the game screen generation unit 113 to generate a game screen 50 for evolutionary fusion illustrated in FIG. 18. Next, when the determination is denied, the fusion processing unit 111C refers to the character picture book information illustrated in FIG. 14, and determines whether the player has possessed the all material characters associated with the base character before. The fusion processing unit 111C then causes the game screen generation unit 113 to generate a game screen 60 for evolutionary fusion illustrated in FIG. 19 according to a determination result.

Figure 18:
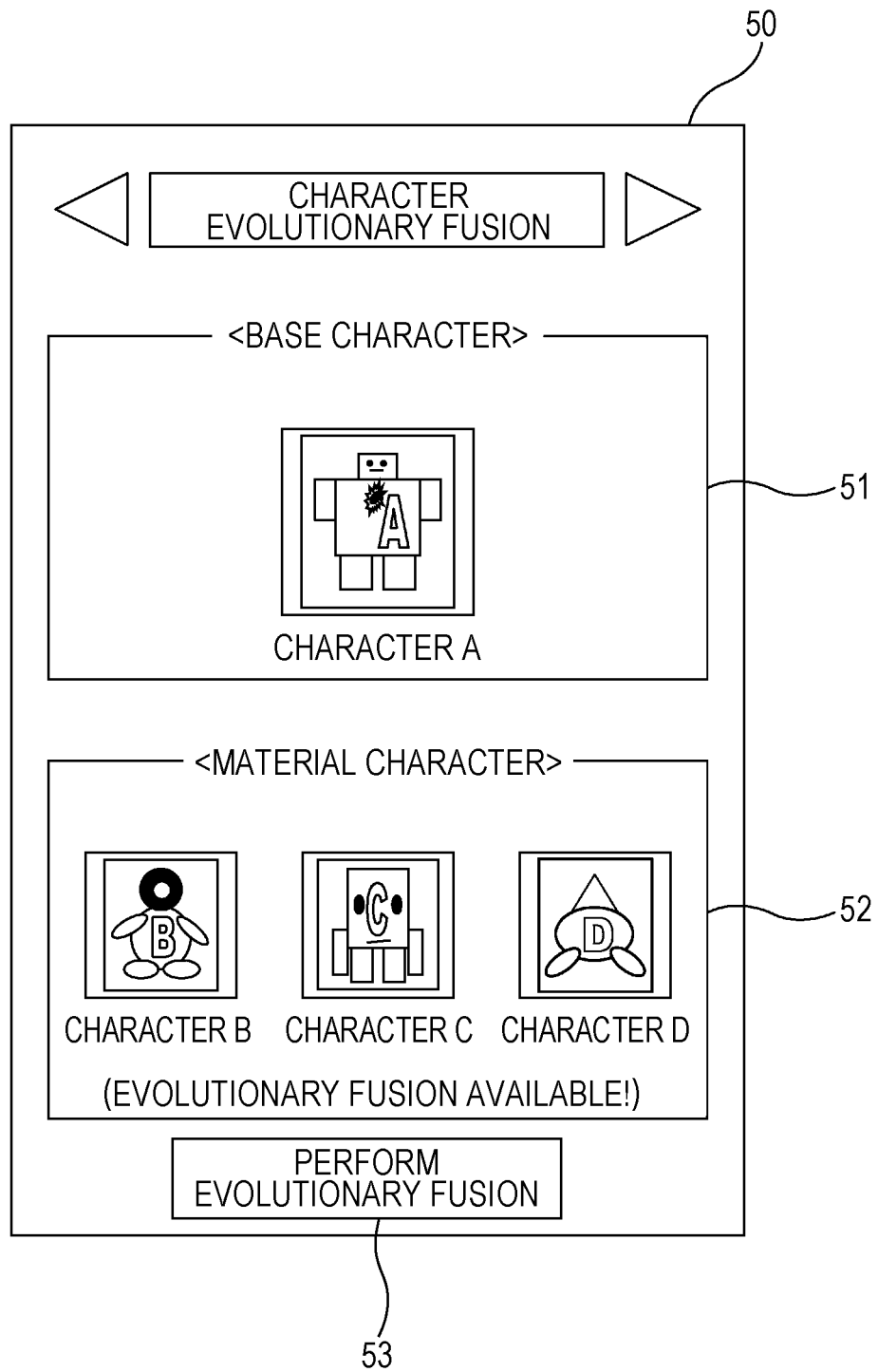
FIG. 18 is a diagram illustrating an example of a game screen for evolutionary fusion.

FIG. 18 is a diagram illustrating an example of the game screen 50 for evolutionary fusion when the all material characters have been already obtained. The game screen 50 for evolutionary fusion includes a base character display area 51, a material character display area 52, and an operation button 53. Since the player has already obtained the all material characters, character images of the all material characters arranged on the material character display area 52 are clearly displayed. Therefore, by selecting the operation button 53, the player can perform fusion of (combine) the all material characters (a "character B", a "character C", and a "character D") and the base character (a "character A").

Figure 19:
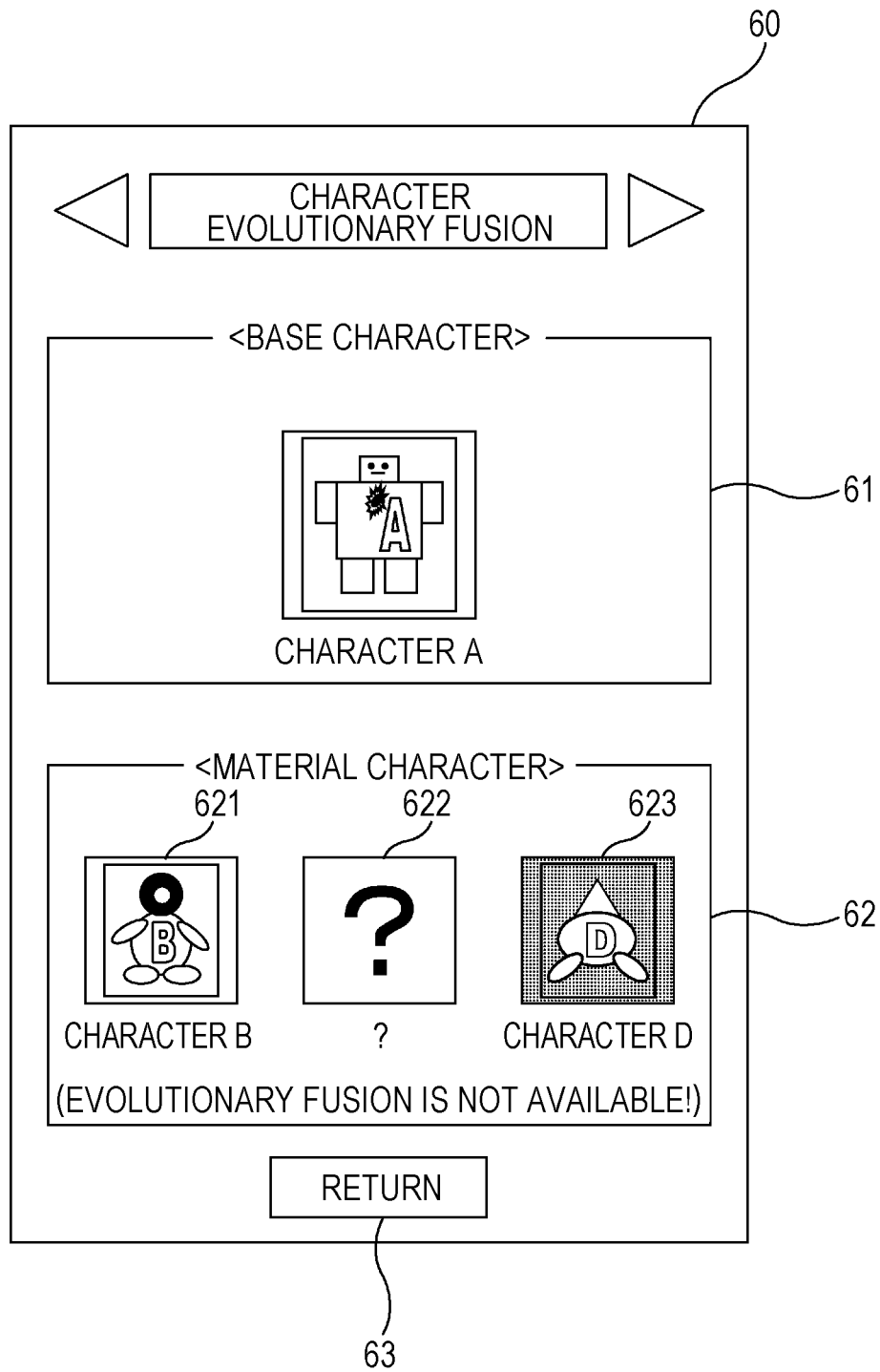
FIG. 19 is a diagram illustrating an example of a game screen for evolutionary fusion.

FIG. 19 is a diagram illustrating an example of the game screen 60 for evolutionary fusion when some of the all material characters have not been obtained. The game screen 60 for evolutionary fusion includes a base character display area 61, a material character display area 62, and an operation button 63. On the material character display area 62, material characters 621 to 623 are arranged. Since the material character 621 is a character possessed by the player, the character image is in a clearly-displayed state. Since the material character 622 is a character that has not been possessed by the player, the character image is in a non-displayed state (secret state). Since the material character 623 is a character that is not possessed by the player but has been possessed before, the character image is displayed in gray. Among the material characters 621 to 623, as for the material characters 621 and 623, the detailed information thereof can be browsed. As for the material character 622, it is in the secret state, and thus the detailed information thereof cannot be browsed. Therefore, when the player wishes to obtain the material character 623, for example, the player can browse the detailed information thereof by designating the material character 623.

Then, the server device 10 transmits screen data (HTML file) corresponding to the game screen for evolutionary fusion generated in this way to the player terminal 20, which is the requestor, through a network.

Next, the player terminal 20 displays the game screen for evolutionary fusion (web page) corresponding to the screen data in the terminal display unit 24 by analyzing the screen data upon receiving the screen data (HTML data) transmitted from the server device 10. Here, the following description is continued on assumption that the game screen 60 for evolutionary fusion illustrated in FIG. 19 is displayed on the terminal display unit 24.

Next, referring back to FIG. 17, when the player designates any of the material characters 621 to 623 arranged on the material character display area 62 and performs an operation to receive the detailed information of the material character while the game screen 60 for evolutionary fusion illustrated in FIG. 19 is displayed, the player terminal 20 transmits a detailed information reception request to the server device 10 (S104). Here, the following description is continued on assumption that the player wishes to obtain the material character 623 (the "character D") from among the material characters 621 to 623.

Next, upon receiving the detailed information reception request transmitted from the player terminal 20, the server device 10 performs the play event selection processing to select a play event in which the designated material character 623 (the character ID of the "character D": "0004", see FIG. 5) is obtainable from among the plurality of play events set in advance (S105).

To be specific, the play event selection unit 112 refers to the state information illustrated in FIG. 7, and selects a stage in which the designated material character 623 ("character D") would appear from among the plurality of stages set in advance (for example, the "stage 4" and the "stage 5"). At this time, the play event selection unit 112 may preferentially select a stage in which the designated material character is more likely to appear (a state in which the designated material character is more likely to be obtained) based on the appearance rate of the character, and displays the stage (for example, may select the "display 5" in preference to the "display 4" and displays only the "stage 5", display the "stage 5" at an upper part than the "stage 4", highlight the "stage 5", and the like). In addition, the play event selection unit 112 may refer to the cleared stage information illustrated in FIG. 16 and control a stage that has not been cleared by the player to be excluded from the objects to be selected (for example, may exclude the "stage 5").

To be specific, the play event selection unit 112 refers to the deck information illustrated in FIG. 9, and selects a deck in which the designated material character 623 ("character D") is obtainable from among the plurality of decks set in advance (for example, the "deck 1").

In this way, the play event selection unit 112 selects, for example, the "stage 4" (playing a battle game in the "stage 4"), the "stage 5" (playing a battle game in the "stage 5"), and the "deck 1" (playing a lottery game using the "deck 1") as the play events in which the designated material character 623 ("character D") is obtainable.

Next, the server device 10 causes the game screen generation unit 113 to generate screen data (HTML file) used for displaying a game screen for detailed information (web page) in the player terminal 20 (S106).

To be specific, the game screen generation unit 113 generates data of the game screen for detailed information including the detailed information (for example, the parameters such as the level, the attack point, and the defense point) related to the designated material character 623 ("character D") based on the character information illustrated in FIG. 5. Further, the game screen generation unit 113 arranges, on the game screen for detailed information, a guided operation button (guidance operation area) for guiding the player to the play event selected by the play event selection unit 112.

Then, the server device 10 transmits screen data (HTML file) corresponding to the game screen for detailed information generated in this way to the player terminal 20, which is the requestor, through a network.

Upon receiving the screen data (HTML data) transmitted from the server device 10, the player terminal 20 displays the game screen for detailed information (web page) in the terminal display unit 24 by analyzing the screen data.

Figure 20:
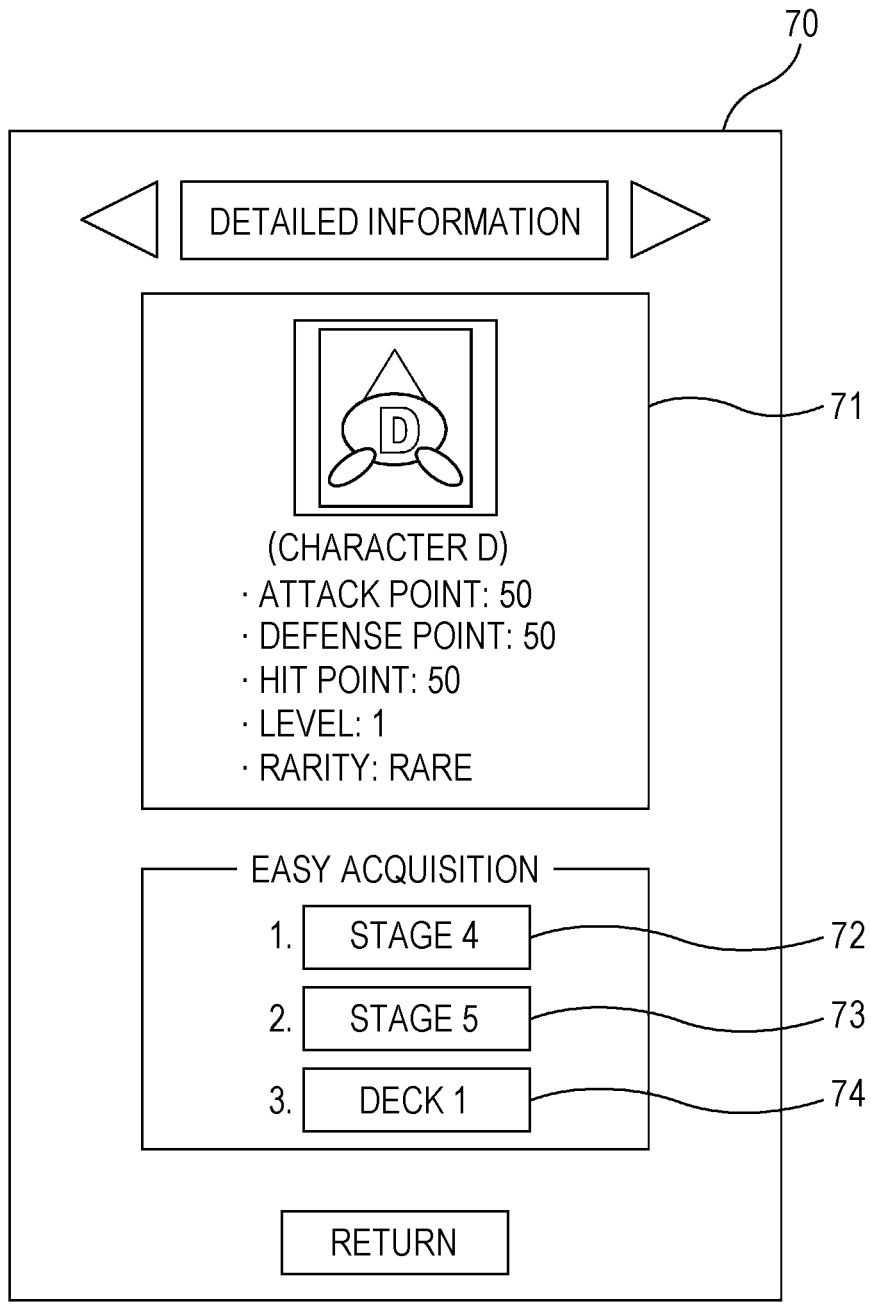
FIG. 20 is a diagram illustrating an example of a game screen for detailed information.

FIG. 20 is a diagram illustrating an example of a game screen 70 for detailed information displayed in the terminal display unit 24. The game screen 70 for detailed information includes a detailed information display area 71 and guided operation buttons 72 to 74. Here, the "stage 4", the "stage 5", and the "deck 1", which are the guided play events, are respectively displayed on the guided operation buttons 72 to 74, corresponding to the fact that the "stage 4" (playing a battle game in the stage 4), the "stage 5" (playing a battle game in the stage 5), and the "deck 1" (playing a lottery game using the deck 1) have been selected as the play events in which the material character 623 ("character D") is obtainable.

Next, referring back to FIG. 17, the player terminal 20 determines whether any of the guided operation buttons 72 to 74 is selected by the player while the game screen 70 for detailed information illustrated in FIG. 20 is displayed (S107). When one of the guided operation buttons 72 to 74 is selected, the player terminal 20 then transmits a play start request that requests the start of a game play with the guided play event to the server device 10 through the terminal communication unit 25.

Next, upon receiving the play start request transmitted from the player terminal 20, the server device 10 performs the game progress processing. That is, the game progress processing unit 111 makes a game progress with the guided play event, and allows the player to play the game (S108). For example, when the guided operation button 72 is selected by the player, the battle processing unit 111A makes a battle game progress in the "stage 4". When the guided operation button 74 is selected by the player, the lottery processing unit 111B makes a lottery game progress using the "deck 1".

Next, as a result of making progress of the game in the guided play event, the server device 10 causes the game progress processing unit 111 to determine whether the material character 623 ("character D") designated by the player has been obtained (S109). When the material character 623 ("character D") has been obtained (S109: YES), the game progress processing unit 111 permits the fusion processing unit 111C to perform fusion of the material character and the base character (S110). To be specific, when the player have obtained the all material characters associated with the base character by the obtainment of the designated material character 623 ("character D"), the game progress processing unit 111 permits evolutionary fusion of the base character. Otherwise, the game progress processing unit 111 permits strengthening fusion of the base character.

<Item Purchase Processing>

When the player designates a shop and an item and performs an operation to start item purchase, the player terminal 20 transmits an item purchase request to the server device 10. Upon receiving the item purchase request transmitted from the player terminal 20, the server device 10 executes the item purchase processing.

To be specific, the purchase processing unit 111D refers to the shop information illustrated in FIG. 10, and selects the item designated by the player from among a plurality of items that can be purchased in the shop. Next, the purchase processing unit 111D refers to the item information illustrated in FIG. 4 and the player information illustrated in FIG. 11, and determines whether the player possess the virtual currency corresponding to the price of the item. When the determination is affirmed, the purchase processing unit 111D causes the virtual currency of the player to be consumed and provides the player with the item. Next, the purchase processing unit 111D updates the possessed item information illustrated in FIG. 13 so that the provided item becomes a character possessed by the player.

<Picture Book Browsing Processing>

When the player performs an operation to browse an item picture book, the player terminal 20 transmits a picture book browsing request to the server device 10. Upon receiving the picture book browsing request transmitted from the player terminal 20, the server device 10 executes the picture book browsing processing.

To be specific, the game progress processing unit 111 refers to the item information illustrated in FIG. 4, the possessed item information illustrated in FIG. 13, and the item picture book information illustrated in FIG. 15, and causes the game screen generation unit 113 to generate a game screen for item picture book after identifying an item that has been possessed by the player before, an item that is possessed by the player, and an item that has not been possessed by the player before.

The server device 10 then transmits screen data (HTML file) corresponding to the game screen for item picture book generated in this way to the player terminal 20, which is the requestor, through a network.

Upon receiving the screen data (HTML data) transmitted from the server device 10, the player terminal 20 displays the game screen for item picture book (web page) in the terminal display unit 24 by analyzing the screen data.

Figure 21:
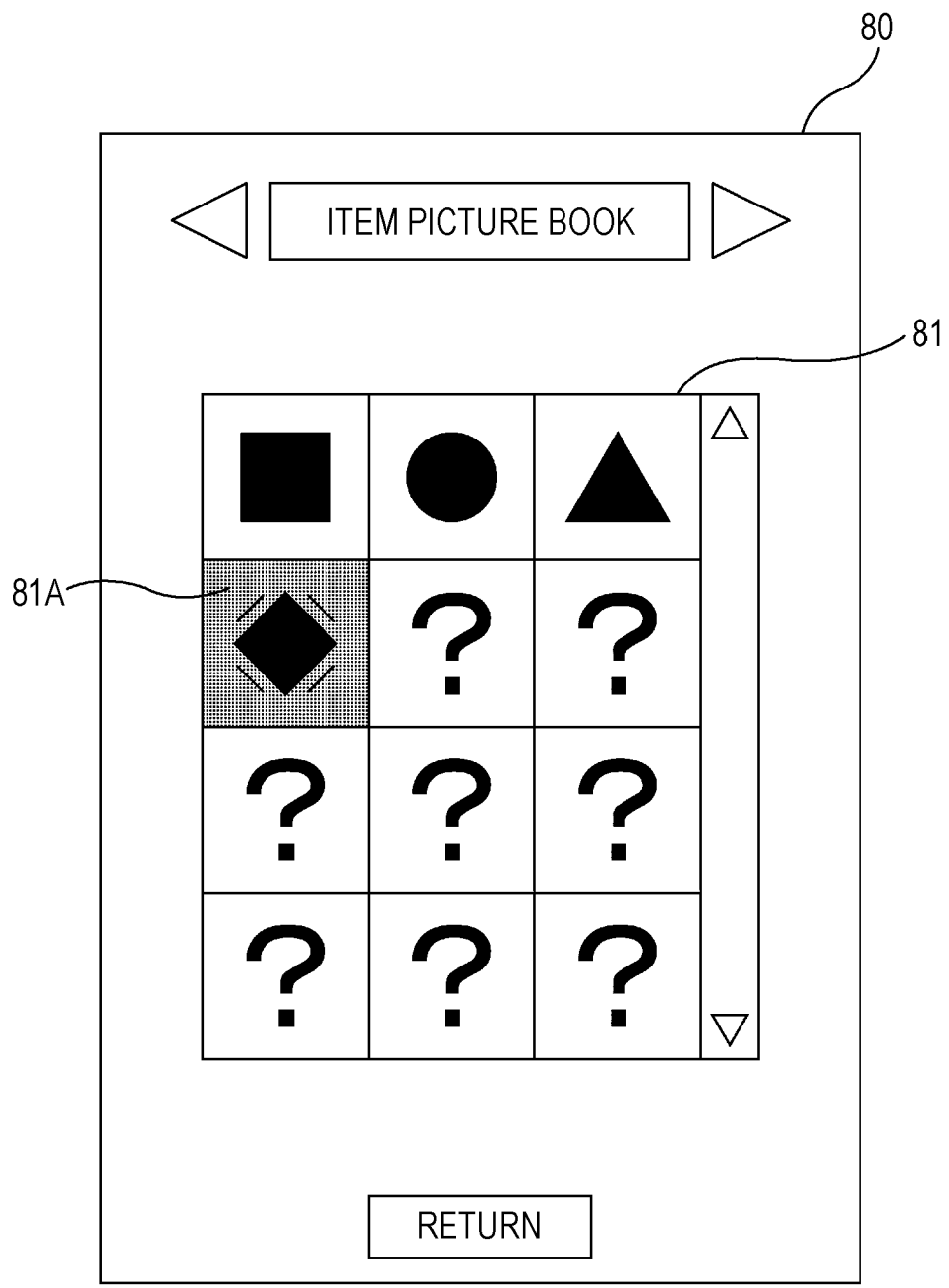
FIG. 21 is a diagram illustrating an example of a game screen for item picture book.

FIG. 21 is a diagram illustrating an example of a game screen 80 for item picture book. The game screen 80 for item picture book includes an item list display area 81. Here, an item 81A is an item that is not currently possessed but has been possessed by the player before. When the player wishes to obtain the item 81A, for example, the player can browse detailed information thereof by designating the item 81A.

Next, when the player designates the item 81A and performs an operation to receive the detailed information while the game screen 80 for item picture book illustrated in FIG. 21 is displayed, the player terminal 20 transmits a detailed information reception request to the server device 10.

Next, upon receiving the detailed information reception request transmitted from the player terminal 20, the server device 10 performs the play event selection processing to select a play event in which the designated item 81A is obtainable from among the plurality of play events set in advance.

To be specific, the play event selection unit 112 refers to the shop information illustrated in FIG. 10, and selects a shop in which the designated item 81A can be purchased from among the plurality of shops set in advance. To be specific, the play event selection unit 112 refers to the character information illustrated in FIG. 5 and identifies a character that possesses the item 81A, and then refers to the stage information illustrated in FIG. 7 and selects a stage in which the character that possesses the item 81A would appear from among the plurality of stages set in advance.

In this way, the play event selection unit 112 selects the "shop 1" (purchasing the item at the "shop 1") and the "stage 3" (playing a battle game in the "stage 3") as the play events in which the designated item 81A is obtainable.

Next, the server device 10 causes the game screen generation unit 113 to generate screen data (HTML file) used for displaying the game screen for detailed information (web page) in the player terminal 20.

To be specific, the game screen generation unit 113 generates data of the game screen for detailed information including the detailed information related to the designated item 81A (including a price, a function, and the like, for example) based on the item information illustrated in FIG. 4. Further, the game screen generation unit 113 arranges, on the game screen for detailed information, a guided operation button (guidance operation area) for guiding the player to the play event selected by the play event selection unit 112.

Then, the server device 10 transmits screen data (HTML file) corresponding to the game screen for detailed information generated in this way to the player terminal 20, which is the requestor, through a network.

Upon receiving the screen data (HTML data) transmitted from the server device 10, the player terminal 20 displays the game screen for detailed information (web page) in the terminal display unit 24 by analyzing the screen data.

Figure 22:
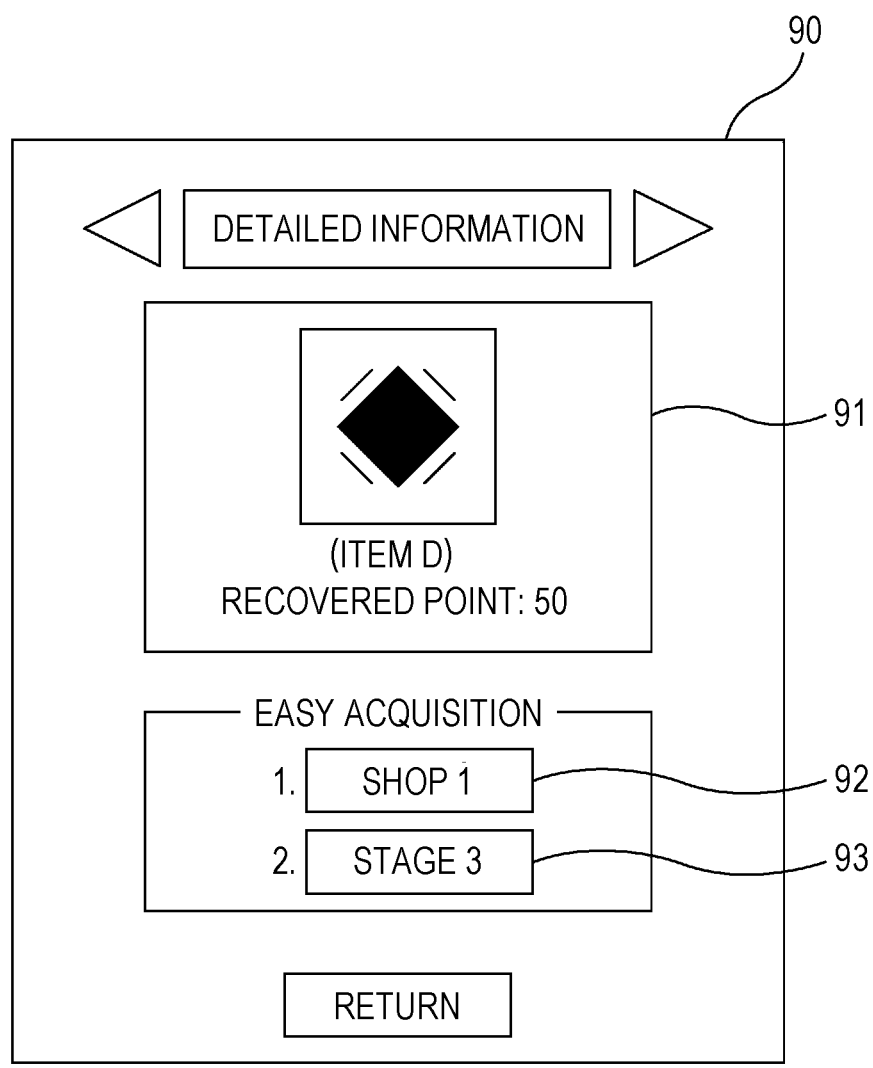
FIG. 22 is a diagram illustrating an example of a game screen for detailed information.

FIG. 22 is a diagram illustrating an example of a game screen 90 for detailed information displayed in the terminal display unit 24. The game screen 90 for detailed information includes a detailed information display area 91 and a guided operation buttons 92 and 93. Here, the "shop 1" and the "shop 3", which are the guided play events, are respectively displayed on the guided operation buttons 92 and 93, corresponding to the fact that the "shop 1" (purchasing at the "shop 1") and the "stage 3" (playing a battle game in the "stage 3") have been selected as the play events in which the item 81A is obtainable.

Next, the player terminal 20 determines whether either the guided operation button 92 or 93 has been selected by the player while the game screen 90 for detailed information illustrated in FIG. 22 is displayed. When either the guided operation button 92 or 93 has been selected, the player terminal 20 transmits a play start request that requests the start of a game play with the guided play event to the server device 10 through the terminal communication unit 25.

Next, upon receiving the play start request transmitted from the player terminal 20, the server device 10 performs the game progress processing. That is, the game progress processing unit 111 makes a game progress with the guided play event and allows the player to play the game. For example, when the guided operation button 92 has been selected by the player, the purchase processing unit 111D causes the player to purchase the item 81A at the "shop 1". When the guided operation button 93 has been selected by the player, the battle processing unit 111A makes a battle game progress in the "stage 3".

<Summary>

As described above, according to the game system 1 of the present embodiment, when the player designates a character or an item, the player can browse detailed information related to the character and the item. Then, when the player wishes to obtain the browsed character or item, the player can select the guided operation button. The player is instantly guided to a play event in which the character or the item is obtainable by operating the guided operation button. Therefore, it is not necessary to randomly search for a stage of a battle game or a deck of a lottery game for seeking the character or the item, whereby the labor to search for the character and the item can be saved.

Other Embodiments

The above-described embodiments have been given for easy understanding of the present invention, and are not used to construe the present invention in a limited manner. The present invention can be changed and improved without departing from the gist of the invention and includes its equivalents. Especially, embodiments described below are also included in the present invention.

<Character Fusion Processing>

In the above-described present embodiment, when having obtained a material character as a result of a game play with the guided play event, the fusion processing unit 111C may automatically perform the evolutionary fusion or display a game screen for encouraging the player to perform the evolutionary fusion on condition that the all material characters associated with the base character have been obtained.

In the present embodiment, a case has been exemplarily described, in which the player is instantly guided to a play event in which the designated material character is obtainable by operating the guided operation button, in performing the evolutionary fusion of the base character. However, the present invention is not limited to the example. For example, when a material character for strengthening is set to the base character in advance, the player may be guided to a play event in which the designated material character for strengthening is obtainable, in performing the strengthening fusion of the base character.

<Picture Book Browsing Processing>

While, in the present embodiment, a case of browsing the item picture book has been exemplarily described, the present invention is not limited to the example, and may be applied to a case of browsing the character picture book using the character picture book information illustrated in FIG. 14 Further, when the material character 622 in the secret state illustrated in FIG. 19 is designated, the detailed information may not be displayed on the detailed information display area 71 illustrated in FIG. 20 but the guided operation buttons 72 and 74 may be displayed.

<Play Event Selection Processing>

The present embodiment is not limited to the case of guiding the player to a stage of a battle game or to a deck of a lottery game. For example, a map is divided into a plurality of areas, an item or a character obtainable in each area is set in advance, and the player may be guided to a certain area on the map by operating a guided operation button. In such a case, the play event selection unit 112 selects an "area 1" (moving the player character in the "area 1") as the play event in which a designated character or item is obtainable, for example. Then, when the guided operation button is operated by the player, the game progress processing unit 111 moves the player character in the "area 1" and allows the player to obtain the item.

<Server Device>

In the above-described present embodiments, the game system 1 provided with one server device 10 as an example of a server device has been exemplarily described. However, the game system 1 is not limited to this example, and may be provided with a plurality of server devices 10 as an example of the server device. That is, a plurality of server devices 10 is connected through a network 2, and each of the server devices 10 may perform various types of processing in a distributed manner. Note that the server device 10 is an example of a computer.

<Information Processing Device>

In the above-described game system 1 in the present embodiments, a case has been exemplarily described, in which various types of processing are executed based on a game program by the server device 10 and the player terminal 20 in cooperation with each other. However, the game system 1 is not limited to the example. The above-described various types of processing may be executed by the player terminal 20 alone or by the server device 10 alone as an information processing device based on the game program.

Further, it may be configured such that the player terminal 20 bares a part of the functions as the information processing device. In this case, the server device 10 and the player terminal 20 constitute the information processing device. Note that the information processing device is an example of a computer provided with a processor and a memory.

What is claimed is:

1. A non-transitory computer-readable storage medium for causing a computer to execute:
    while there is displayed a game screen including a game content selection operation area in which each of items of game content is displayed in any one of a first display form indicating that the item of the game content is possessed by a player, a second display form indicating that the item of the game content has not been possessed by the player, and a third display form indicating that the item of the game content is not possessed by the player but has been possessed by the player, play event selection processing not to select a play event in which the item of the game content of the second display form is obtainable when an operation to designate an item of the game content displayed in the second display form has been performed by the player and to select a play event in which the designated item of the game content of the third display form is obtainable from among a plurality of play events set in advance when an operation to designate an item of the game content displayed in the third display form has been performed by the player;
    game screen generation processing to generate a game screen including a guidance operation area that guides the player to the selected play event; and
    game progress processing to make a game progress with the guided play event and to make the player obtain the item of the game content of the third display form when the guidance operation area is operated by the player while the game screen is displayed.

2. The non-transitory computer-readable storage medium according to claim 1, wherein
    while there is displayed the game screen including the game content selection operation area in which each of all items of material game content associated with base game content is displayed in any one of the first display form, the second display form, and the third display form, the play event selection processing does not select a play event in which the item of the material game content of the second display form is obtainable when an operation to designate an item of the material game content displayed in the second display form has been performed by the player and selects a play event in which the designated item of the material game content of the third display form is obtainable from among the plurality of play events set in advance when an operation to designate an item of the material game content displayed in the third display has been performed by the player, and
        when the designated item of the material game content of the third display form has been obtained by the player when making the game for causing the player to obtain the item of the material game content of the third display form progress with the guided play event, the game progress processing permits fusion of the obtained item of the material game content of the third display form and the base game content.

3. The non-transitory computer-readable storage medium according to claim 2, for causing the computer to execute:
    when all items of the material game content associated with the base game content have been obtained by the player, game content fusion processing to vary a parameter set to the base game content by performing fusion of the base game content and the all items of the material game content.

4. The non-transitory computer-readable storage medium according to claim 1, wherein
    the play event selection processing selects a play event in which a probability of obtaining the designated item of the game content is set higher in preference to a play event to which the probability of obtaining the designated item of the game content is set lower, from among a plurality of play events set in advance.

5. The non-transitory computer-readable storage medium according to claim 1, wherein
    the play event selection processing selects a play event in which the designated item of the game content is obtainable from among the plurality of play events based on player information related to the player.

6. An information processing device comprising:
    a play event selection unit configured, while there is displayed a game screen including a game content selection operation area in which each of items of game content is displayed in any one of a first display form indicating that the item of the game content is possessed by a player, a second display form indicating that the item of the game content has not been possessed by the player, and a third display form indicating that the item of the game content is not possessed by the player but has been possessed by the player is displayed, not to select a play event in which the item of the game content of the second display form is obtainable when an operation to designate an item of the game content displayed in the second display form has been performed by the player and to select a play event in which the designated item of the game content of the third display form is obtainable from among a plurality of play events set in advance when an operation to designate an item of the game content displayed in the third display form has been performed by the player;
    a game screen generation unit configured to generate a game screen including a guidance operation area that guides the player to the selected play event; and
    a game progress processing unit configured, when the guidance operation area has been operated by the player while the game screen is displayed, to make a game for causing the item of the material game content of the third display form progress with the guided play event and to make the player play the game.

* * * * *